(12) United States Patent  
Hwang et al.

(10) Patent No.: US 12,141,367 B2  
(45) Date of Patent: *Nov. 12, 2024

(54) HAND GESTURES FOR ANIMATING AND CONTROLLING VIRTUAL AND GRAPHICAL ELEMENTS

(71) Applicant: Snap Inc., Santa Monica, CA (US)

(72) Inventors: Viktoria Hwang, Los Angeles, CA (US); Karen Stolzenberg, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,868

(22) Filed: Nov. 3, 2023

(65) Prior Publication Data

US 2024/0061515 A1 Feb. 22, 2024

Related U.S. Application Data

(63) Continuation of application No. 17/719,654, filed on Apr. 13, 2022, now Pat. No. 11,861,070.

(Continued)

(51) Int. Cl.
*G06F 3/0482* (2013.01)
*G02B 27/01* (2006.01)
(Continued)

(52) U.S. Cl.
CPC .......... *G06F 3/017* (2013.01); *G02B 27/0101* (2013.01); *G02B 27/017* (2013.01);
(Continued)

(58) Field of Classification Search
CPC ....... G06T 13/80; G06T 11/001; G06T 11/60; G06T 2200/24; G06T 13/40; G06T 15/04;
(Continued)

(56) References Cited

U.S. PATENT DOCUMENTS 6,028,271 A 2/2000 Gillespie et al.
6,323,846 B1 11/2001 Westerman et al.
(Continued)

FOREIGN PATENT DOCUMENTS

CN 106199511 A 12/2016
EP 3116615 A1 1/2017
(Continued)

OTHER PUBLICATIONS

Cas and Chary VR: https://www.youtube.com/watch?v = _8VqQfrHG94 , viewed on Dec. 4, 2021, published online on Feb. 25, 2020 (Year: 2020).

(Continued)

*Primary Examiner* — Rayeez R Chowdhury

(74) *Attorney, Agent, or Firm* — CM Law; Stephen J. Weed

(57) ABSTRACT

Example systems, devices, media, and methods are described for controlling one or more virtual elements on a display in response to hand gestures detected by an eyewear device that is capturing frames of video data with its camera system. An image processing system detects a hand and presents a menu icon on the display in accordance with a detected current hand location. The image processing system detects a series of hand shapes in the captured frames of video data and determines whether the detected hand shapes match any of a plurality of predefined hand gestures stored in a hand gesture library. In response to a match, the method includes executing an action in accordance with the matching hand gesture. In response to an opening gesture, an element animation system presents one or more graphical (Continued)

elements incrementally moving along a path extending away from the menu icon. A closing hand gesture causes the elements to retreat along the path toward the menu icon.

18 Claims, 14 Drawing Sheets

Related U.S. Application Data

(60) Provisional application No. 63/176,644, filed on Apr. 19, 2021.

(51) Int. Cl.
| | |
|---|---|
| *G06F 3/01* | (2006.01) |
| *G06F 3/04815* | (2022.01) |
| *G06F 3/04817* | (2022.01) |
| *G06V 20/40* | (2022.01) |
| *G06V 40/10* | (2022.01) |
| *G06V 40/20* | (2022.01) |

(52) U.S. Cl.
CPC .......... *G06F 3/011* (2013.01); *G06F 3/04815* (2013.01); *G06F 3/04817* (2013.01); *G06F 3/0482* (2013.01); *G06V 20/46* (2022.01); *G06V 40/113* (2022.01); *G06V 40/28* (2022.01); *G02B 2027/0138* (2013.01); *G02B 2027/014* (2013.01); *G02B 2027/0178* (2013.01)

(58) Field of Classification Search
CPC ............. G06T 19/20; G06T 2219/2012; G06T 2219/2016; G06T 1/20; G06T 13/20; G06T 17/00; G06T 2210/04; G06T 13/00; G06F 3/0481; G06F 3/0484; G06F 8/38; G06F 3/011; G06F 3/017; G06F 3/0304; G06F 3/04812; G06F 3/0482; G06F 3/04847; G06F 3/1454
See application file for complete search history.

(56) References Cited

U.S. PATENT DOCUMENTS

| | | | |
|---|---|---|---|
| 8,799,821 | B1 | 8/2014 | Rose et al. |
| 9,024,842 | B1 | 5/2015 | Gomez et al. |
| 9,098,739 | B2 | 8/2015 | Mutto et al. |
| 9,207,771 | B2 | 12/2015 | Antoniac |
| 9,235,051 | B2 | 1/2016 | Salter et al. |
| 9,459,454 | B1 | 10/2016 | The et al. |
| 9,541,996 | B1 | 1/2017 | Baxter et al. |
| 9,552,673 | B2 | 1/2017 | Hilliges et al. |
| 9,671,566 | B2 | 6/2017 | Abovitz et al. |
| 9,990,029 | B2 | 6/2018 | Kochi |
| 9,996,983 | B2 | 6/2018 | Mullins |
| 10,057,400 | B1 | 8/2018 | Gordon et al. |
| 10,146,414 | B2 | 12/2018 | Heater |
| 10,180,714 | B1* | 1/2019 | Kin ..................... G06F 3/04883 |
| 10,220,303 | B1 | 3/2019 | Schmidt et al. |
| 10,288,419 | B2 | 5/2019 | Abovitz et al. |
| 10,372,228 | B2 | 8/2019 | Mao et al. |
| 10,394,334 | B2 | 8/2019 | Wang |
| 10,429,923 | B1 | 10/2019 | Johnston et al. |
| 10,509,461 | B2 | 12/2019 | Mullen |
| 10,579,207 | B2 | 3/2020 | Piya et al. |
| 10,642,369 | B2 | 5/2020 | Iyer et al. |
| 10,782,779 | B1 | 9/2020 | Eubank et al. |
| 10,852,838 | B2 | 12/2020 | Bradski et al. |
| 10,853,991 | B1 | 12/2020 | Yan et al. |
| 10,866,093 | B2 | 12/2020 | Abovitz et al. |
| 10,902,250 | B2 | 1/2021 | Konin et al. |
| 10,909,762 | B2 | 2/2021 | Karalis et al. |
| 10,928,975 | B2 | 2/2021 | Wang et al. |
| 10,936,080 | B2 | 3/2021 | Marcolina et al. |
| 11,003,307 | B1 | 5/2021 | Ravasz et al. |
| 11,086,126 | B1 | 8/2021 | Gollier et al. |
| 11,275,453 | B1 | 3/2022 | Tham et al. |
| 11,277,597 | B1 | 3/2022 | Canberk et al. |
| 11,294,472 | B2 | 4/2022 | Tang et al. |
| 11,320,911 | B2 | 5/2022 | Schwarz et al. |
| 11,334,179 | B2 | 5/2022 | Li et al. |
| 11,380,021 | B2* | 7/2022 | Nakata ................... A63F 13/211 |
| 11,481,025 | B2 | 10/2022 | Shimizu et al. |
| 11,494,000 | B2 | 11/2022 | Katz et al. |
| 11,500,512 | B2 | 11/2022 | Reithmeir et al. |
| 11,520,399 | B2 | 12/2022 | Kang et al. |
| 11,531,402 | B1 | 12/2022 | Stolzenberg |
| 11,546,505 | B2 | 1/2023 | Canberk |
| 11,631,228 | B2 | 4/2023 | Fieldman |
| 11,861,070 | B2 | 1/2024 | Hwang et al. |
| 2003/0156756 | A1 | 8/2003 | Gokturk et al. |
| 2005/0271279 | A1 | 12/2005 | Fujimura et al. |
| 2007/0220108 | A1 | 9/2007 | Whitaker |
| 2008/0219502 | A1 | 9/2008 | Shamaie |
| 2009/0119609 | A1 | 5/2009 | Matsumoto |
| 2010/0085317 | A1 | 4/2010 | Park et al. |
| 2010/0309140 | A1 | 12/2010 | Widgor |
| 2011/0213664 | A1 | 9/2011 | Osterhout et al. |
| 2012/0027252 | A1 | 2/2012 | Liu et al. |
| 2012/0027263 | A1 | 2/2012 | Liu et al. |
| 2012/0056730 | A1 | 3/2012 | Ujiie et al. |
| 2012/0086729 | A1 | 4/2012 | Baseley et al. |
| 2012/0113223 | A1* | 5/2012 | Hilliges ................... G06F 3/011 |
| | | | 348/46 |
| 2012/0194644 | A1 | 8/2012 | Newcombe et al. |
| 2012/0327117 | A1 | 12/2012 | Weller et al. |
| 2013/0145320 | A1 | 6/2013 | Oosterholt et al. |
| 2013/0328927 | A1 | 12/2013 | Mount et al. |
| 2013/0335324 | A1 | 12/2013 | Kaplan et al. |
| 2014/0043211 | A1 | 2/2014 | Park |
| 2014/0212000 | A1 | 7/2014 | Yagcioglu et al. |
| 2014/0225918 | A1 | 8/2014 | Mittal et al. |
| 2014/0298266 | A1 | 10/2014 | Lapp |
| 2014/0306993 | A1 | 10/2014 | Poulos et al. |
| 2014/0347289 | A1 | 11/2014 | Suh et al. |
| 2014/0361988 | A1 | 12/2014 | Katz et al. |
| 2014/0368533 | A1 | 12/2014 | Salter et al. |
| 2015/0049017 | A1 | 2/2015 | Weber et al. |
| 2015/0073753 | A1 | 3/2015 | Rameau |
| 2015/0091824 | A1* | 4/2015 | Hori ..................... G06F 3/0346 |
| | | | 345/173 |
| 2015/0097719 | A1 | 4/2015 | Balachandreswaran et al. |
| 2015/0109197 | A1 | 4/2015 | Takagi |
| 2015/0169176 | A1 | 6/2015 | Cohen et al. |
| 2015/0199780 | A1 | 7/2015 | Beyk |
| 2015/0269783 | A1 | 9/2015 | Yun |
| 2015/0317833 | A1 | 11/2015 | Ebstyne et al. |
| 2015/0331576 | A1 | 11/2015 | Piya et al. |
| 2015/0370321 | A1 | 12/2015 | Lundberg |
| 2016/0033770 | A1 | 2/2016 | Fujimaki et al. |
| 2016/0035134 | A1 | 2/2016 | Tanaka et al. |
| 2016/0098093 | A1 | 4/2016 | Cheon et al. |
| 2016/0260251 | A1 | 9/2016 | Stafford et al. |
| 2016/0261834 | A1 | 9/2016 | Li et al. |
| 2016/0306431 | A1 | 10/2016 | Stafford et al. |
| 2017/0003746 | A1 | 1/2017 | Anglin et al. |
| 2017/0014683 | A1 | 1/2017 | Maruyama et al. |
| 2017/0028299 | A1 | 2/2017 | The et al. |
| 2017/0053383 | A1 | 2/2017 | Heo |
| 2017/0053447 | A1 | 2/2017 | Chen et al. |
| 2017/0097687 | A1 | 4/2017 | Pinault et al. |
| 2017/0123487 | A1 | 5/2017 | Hazra et al. |
| 2017/0124713 | A1 | 5/2017 | Jurgenson et al. |
| 2017/0140552 | A1 | 5/2017 | Woo et al. |
| 2017/0235372 | A1 | 8/2017 | Song et al. |
| 2017/0270711 | A1 | 9/2017 | Schoenberg |
| 2017/0293364 | A1 | 10/2017 | Wang |
| 2017/0295446 | A1 | 10/2017 | Shivappa |
| 2017/0323488 | A1 | 11/2017 | Mott et al. |
| 2017/0352184 | A1 | 12/2017 | Poulos et al. |
| 2017/0355334 | A1 | 12/2017 | Balan et al. |
| 2018/0005443 | A1 | 1/2018 | Poulos et al. |

(56) References Cited

U.S. PATENT DOCUMENTS

| | | |
|---|---|---|
| 2018/0024641 A1 | 1/2018 | Mao et al. |
| 2018/0039852 A1 | 2/2018 | Nakamura et al. |
| 2018/0075659 A1 | 3/2018 | Browy et al. |
| 2018/0196503 A1 | 7/2018 | Ikeda et al. |
| 2018/0259775 A1 | 9/2018 | Ono et al. |
| 2018/0329209 A1 | 11/2018 | Nattukallingal |
| 2019/0025595 A1 | 1/2019 | Fukuda et al. |
| 2019/0025931 A1 | 1/2019 | Anderson et al. |
| 2019/0102927 A1 | 4/2019 | Yokokawa |
| 2019/0122085 A1 | 4/2019 | Tout et al. |
| 2019/0139320 A1 | 5/2019 | Davies et al. |
| 2019/0146598 A1 | 5/2019 | Peri |
| 2019/0155394 A1 | 5/2019 | Bedikian et al. |
| 2019/0167352 A1 | 6/2019 | Mahfouz |
| 2019/0220098 A1 | 7/2019 | Gupta |
| 2019/0251696 A1 | 8/2019 | Wang et al. |
| 2019/0299059 A1 | 10/2019 | Case, Jr. et al. |
| 2019/0318544 A1 | 10/2019 | Skidmore et al. |
| 2019/0324553 A1 | 10/2019 | Liu et al. |
| 2019/0325651 A1 | 10/2019 | Bradner et al. |
| 2019/0361521 A1 | 11/2019 | Stellmach et al. |
| 2019/0362562 A1 | 11/2019 | Benson |
| 2019/0377416 A1 | 12/2019 | Alexander |
| 2019/0385371 A1 | 12/2019 | Joyce et al. |
| 2020/0005026 A1 | 1/2020 | Andersen et al. |
| 2020/0064924 A1 | 2/2020 | Poupyrev et al. |
| 2020/0097065 A1 | 3/2020 | Iyer et al. |
| 2020/0151900 A1 | 5/2020 | Weising et al. |
| 2020/0218423 A1 | 7/2020 | Ohashi |
| 2020/0311396 A1 | 10/2020 | Pollefeys et al. |
| 2020/0312029 A1 | 10/2020 | Heinen et al. |
| 2020/0387228 A1 | 12/2020 | Ravasz et al. |
| 2021/0019036 A1 | 1/2021 | Wang et al. |
| 2021/0026455 A1 | 1/2021 | Dash et al. |
| 2021/0041702 A1 | 2/2021 | Kimura et al. |
| 2021/0090337 A1 | 3/2021 | Ravasz et al. |
| 2021/0096726 A1* | 4/2021 | Faulkner ............ G06F 3/04883 |
| 2021/0174519 A1 | 6/2021 | Bazarevsky et al. |
| 2021/0181938 A1 | 6/2021 | Hassan et al. |
| 2021/0183158 A1 | 6/2021 | Korngold et al. |
| 2021/0208698 A1 | 7/2021 | Martin et al. |
| 2021/0209153 A1 | 7/2021 | Zhang |
| 2021/0263593 A1 | 8/2021 | Lacey |
| 2021/0275914 A1 | 9/2021 | Wu et al. |
| 2021/0286502 A1 | 9/2021 | Lemay et al. |
| 2021/0334524 A1 | 10/2021 | Guo et al. |
| 2021/0373650 A1 | 12/2021 | Kang et al. |
| 2021/0397266 A1 | 12/2021 | Gupta et al. |
| 2022/0088476 A1 | 3/2022 | Canberk et al. |
| 2022/0103748 A1 | 3/2022 | Canberk |
| 2022/0326781 A1 | 4/2022 | Hwang |
| 2022/0139056 A1 | 5/2022 | Fieldman |
| 2022/0171479 A1 | 6/2022 | Chappaz et al. |
| 2022/0179495 A1 | 6/2022 | Agrawal et al. |
| 2022/0206102 A1 | 6/2022 | Brown |
| 2022/0206588 A1 | 6/2022 | Canberk et al. |
| 2022/0334649 A1 | 10/2022 | Hwang et al. |
| 2023/0082789 A1 | 3/2023 | Lu et al. |
| 2023/0117197 A1 | 4/2023 | Stolzenberg |
| 2023/0274511 A1 | 8/2023 | Miller et al. |

FOREIGN PATENT DOCUMENTS

| | | |
|---|---|---|
| EP | 3699736 A1 | 8/2020 |
| KR | 100793834 B1 | 1/2008 |
| WO | 2015192117 A1 | 12/2015 |

OTHER PUBLICATIONS

Chatain, Julia et al., "DigiGlo: Exploring the Palm as an Input and Display Mechanism through Digital Gloves," Association for Computing Machinery, Chi Play '20, Nov. 2-4, 2020, Virtual Event, Canada, 12 pages.

Cirulis Arnis: "Large Scale Augmented Reality for Collaborative Environments", Jul. 10, 2020 (Jul. 10, 2020), Computer Vision—ECCV 2020 : 16th European Conference, Glasgow, UK, Aug. 23-28, 2020 : Proceedings; [Lecture Notes in Computer Science ; ISSN 0302-9743], Springer International Publishing, Cham, pp. 325-335, XP047554326, ISBN: 978-3-030-58594-5.

Engadget: "Google Glass Gesture Recognition by OnTheGo Platforms at CES 2014 : Engadget", Jan. 8, 2014 (Jan. 8, 2014), XP055859805, Retrieved from the Internet: URL: https://www.youtube.com/watch?v=d_jl_ZxPECg [retrieved on Nov. 11, 2021] 00:39s, 00:55s, 01:00-01:10s.

Google Atap: "Welcome to Project Soli", published May 29, 2015, XP055903745, Retrieved from the Internet: URL: https://www.youtube.com/watch?v=OQNiZf SsPc0&t=61s [retrieved on Mar. 21, 2022].

International Search Report and Written Opinion for International Application No. PCT/US2021/033642, dated Aug. 30, 2021 (Aug. 30, 2021)—11 pages.

International Search Report and Written Opinion for International Application No. PCT/US2021/051109, dated Dec. 10, 2021 (Dec. 10, 2021)—17 pages.

International Search Report and Written Opinion for International Application No. PCT/US2021/063295, dated Mar. 17, 2022 (Mar. 17, 2022) —13 pages.

International Search Report and Written Opinion for International Application No. PCT/US2021/063340, dated Apr. 4, 2022 (May 4, 2022)—10 pages.

International Search Report and Written Opinion for International Application No. PCT/US2022/023608, dated Jul. 11, 2022 (Jul. 11, 2022)—12 pages.

International Search Report and Written Opinion for International Application No. PCT/US2022/024565, dated Jul. 25, 2022 (Jul. 25, 2022)—15 pages.

Matthias Schwaller et al: "Pointing in the Air: Measuring the Effect of Hand Selection Strategies on Performance and Effort", Jul. 1, 2013 (Jul. 1, 2013), Human Factors in Computing and Informatics Springer Berlin Heidelberg, Berlin, Heidelberg, pp. 732-747, XP047033542, ISBN: 978-3-642-39061-6, p. 740; figure 4.

Partial International Search Report and Written Opinion for International Application No. PCT/US2021/047637, dated Jan. 7, 2022 (Jan. 7, 2022)—10 pages.

Song, Chen, "Sensor Fusion for Learning-based Tracking of Controller Movement in Virtual Reality". Sep. 2019, IEEE, pp. 1-5. (Year: 2019).

U.S. Appl. No. 16/865,995, filed May 4, 2020 to Canberk et al.
U.S. Appl. No. 17/588,934, filed Jan. 31, 2022 to Stolzenberg.
U.S. Appl. No. 17/589,065, filed Jan. 31, 2022 to Stolzenberg.
U.S. Appl. No. 17/714,352, filed Apr. 6, 2022 to Hwang et al.
U.S. Appl. No. 17/719,654, filed Apr. 13, 2022 to Hwang et al.
1st European Office Action for European Application No. 21773937.4 dated May 2, 2024, 6 pages.

* cited by examiner

HAND GESTURES FOR ANIMATING AND CONTROLLING VIRTUAL AND GRAPHICAL ELEMENTS

CROSS-REFERENCE TO RELATED APPLICATIONS

This application is a Continuation of U.S. application Ser. No. 17/719,654 filed on Apr. 13, 2022, which claims priority to U.S. Provisional Application Ser. No. 63/176,644 filed on Apr. 19, 2021, the contents of both of which are incorporated herein by reference.

TECHNICAL FIELD

Examples set forth in the present disclosure relate to the field of display control for electronic devices, including wearable devices such as eyewear. More particularly, but not by way of limitation, the present disclosure describes the real-time tracking of hand gestures for interacting with virtual elements on a display.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems, and displays.

Graphical user interfaces allow the user to interact with displayed content, including virtual objects and graphical elements such as icons, taskbars, list boxes, menus, buttons, and selection control elements like cursors, pointers, handles, and sliders.

Virtual reality (VR) technology generates a complete virtual environment including realistic images, sometimes presented on a VR headset or other head-mounted display. VR experiences allow a user to move through the virtual environment and interact with virtual objects. Augmented reality (AR) is a type of VR technology that combines real objects in a physical environment with virtual objects and displays the combination to a user. The combined display gives the impression that the virtual objects are authentically present in the environment, especially when the virtual objects appear and behave like the real objects. Cross reality (XR) is generally understood as an umbrella term referring to systems that include or combine elements from AR, VR, and MR (mixed reality) environments.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
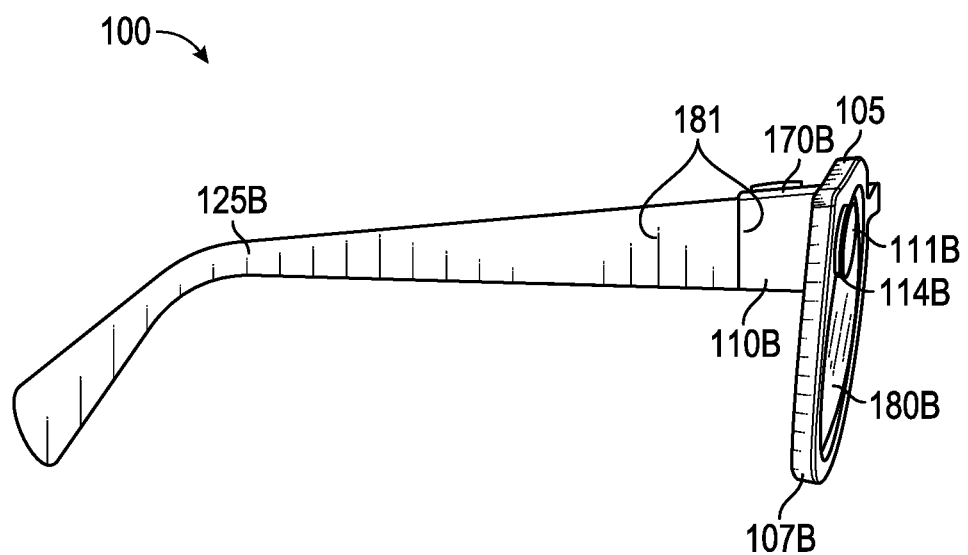
FIG. 1A is a side view (right) of an example hardware configuration of an eyewear device suitable for use in an example element animation system.

Various implementations and details are described with reference to examples for presenting and controlling graphical elements and virtual elements in AR, VR, XR, or a combination thereof, using hand gestures. For example, a relaxed hand cradles an apparently graspable menu icon, such as a ball. Active hand tracking detects the opening of the hand, causing an opening event which is closely correlated with the physical action of opening the fingers of the hand. Closing the hand causes a closing event.

Examples include a method of controlling a graphical element in response to hand gestures detected with an eyewear device. The eyewear device comprising a camera system, an image processing system, and a display. The method includes capturing frames of video data with the camera system and detecting a hand in the captured frames of video data with the image processing system. The method further includes presenting on the display a menu icon at a current icon position, in accordance with the detected current hand location. The method includes detecting a series of hand shapes in the captured frames of video data and determining whether the detected hand shapes match any of a plurality of predefined hand gestures stored in a hand gesture library. In response to a match, the method includes executing an action in accordance with the matching hand gesture.

For example, the method includes detecting a first series of hand shapes and then determining, with the image processing system, whether the detected first series of hand shapes matches a first predefined hand gesture (e.g., an opening gesture) among the plurality of predefined hand gestures. In response to a match, the method includes presenting on the display one or more graphical elements adjacent the current icon position. The method further includes detecting a second series of hand shapes, determining whether the detected second series of hand shapes matches a second predefined hand gesture (e.g., a closing gesture), and, in response to a match, removing the one or more graphical elements from the display.

Although the various systems and methods are described herein with reference to capturing sill images with an eyewear device, the technology described may be applied to selecting and capturing still images from a sequence of frames of video data that were captured by other devices.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

The term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and augmented reality. As used herein, the terms "pose" or "gesture" (or variations thereof) are intended to be inclusive of both poses and gestures; in other words, the use of one term does not exclude the other.

The term "bimanual gesture" means and describes a gesture performed with both hands. One hand may be relatively stationary, while the other hand is moving. In some bimanual gestures, both hands appear relatively stationary; the gesture occurs in small movements between the fingers and surfaces of the two hands. Although the two hands may operate in relative opposition to perform a bimanual gesture, the term includes gestures made by both hands operating together, in tandem.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

The eyewear device 100 includes a right optical assembly 180B with an image display to present images, such as depth images. As shown in FIGS. 1A and 1, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
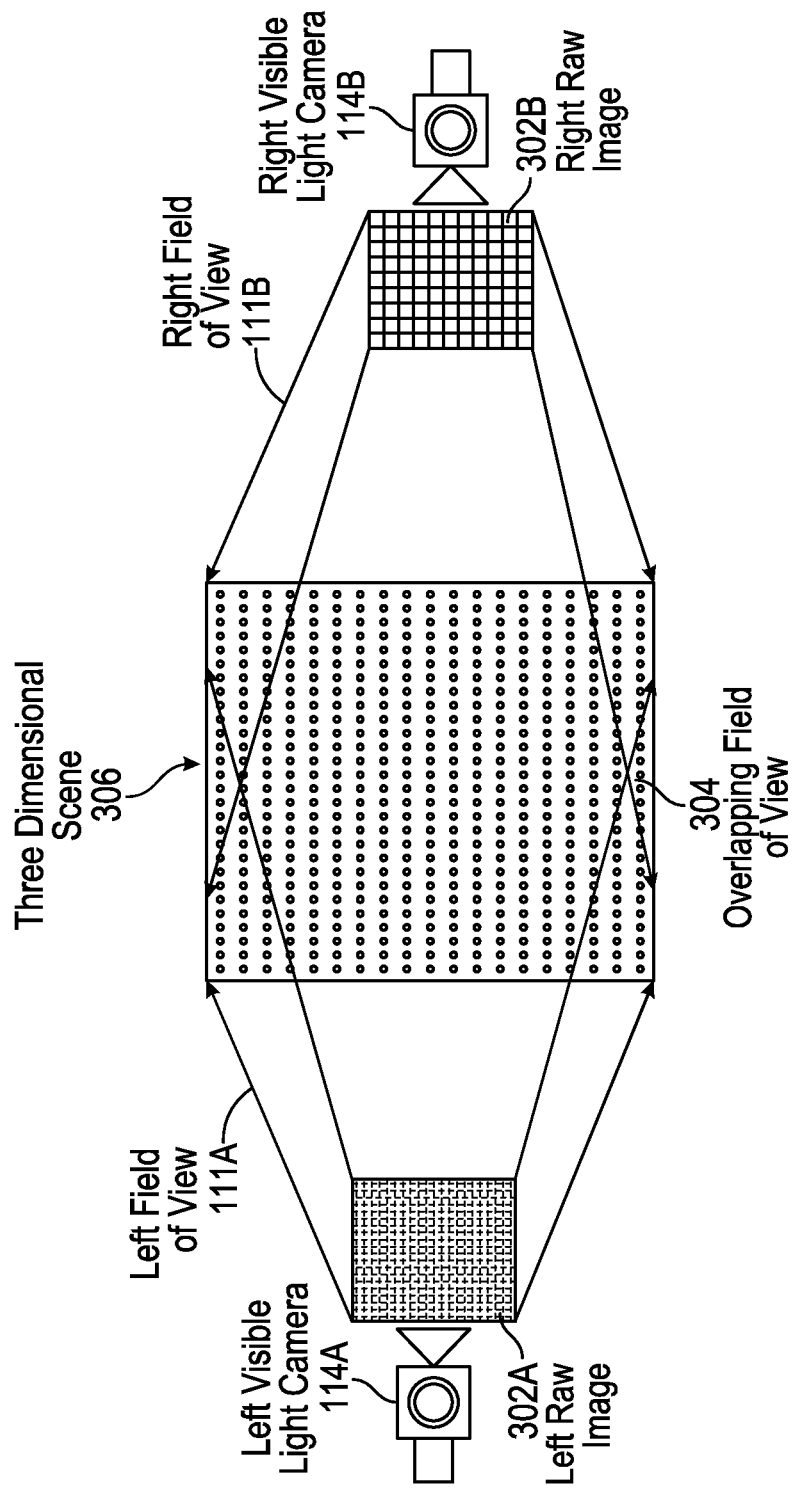
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 480p (e.g., 640×480 pixels), 720p, 1080p, or greater. Other examples include visible-light cameras 114A, 114B that can capture high-definition (HD) video at a high frame rate (e.g., thirty to sixty frames per second, or more) and store the recording at a resolution of 1216 by 1216 pixels (or greater).

The eyewear device 100 may capture image sensor data from the visible-light cameras 114A, 114B along with geolocation data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

Figure 1B:
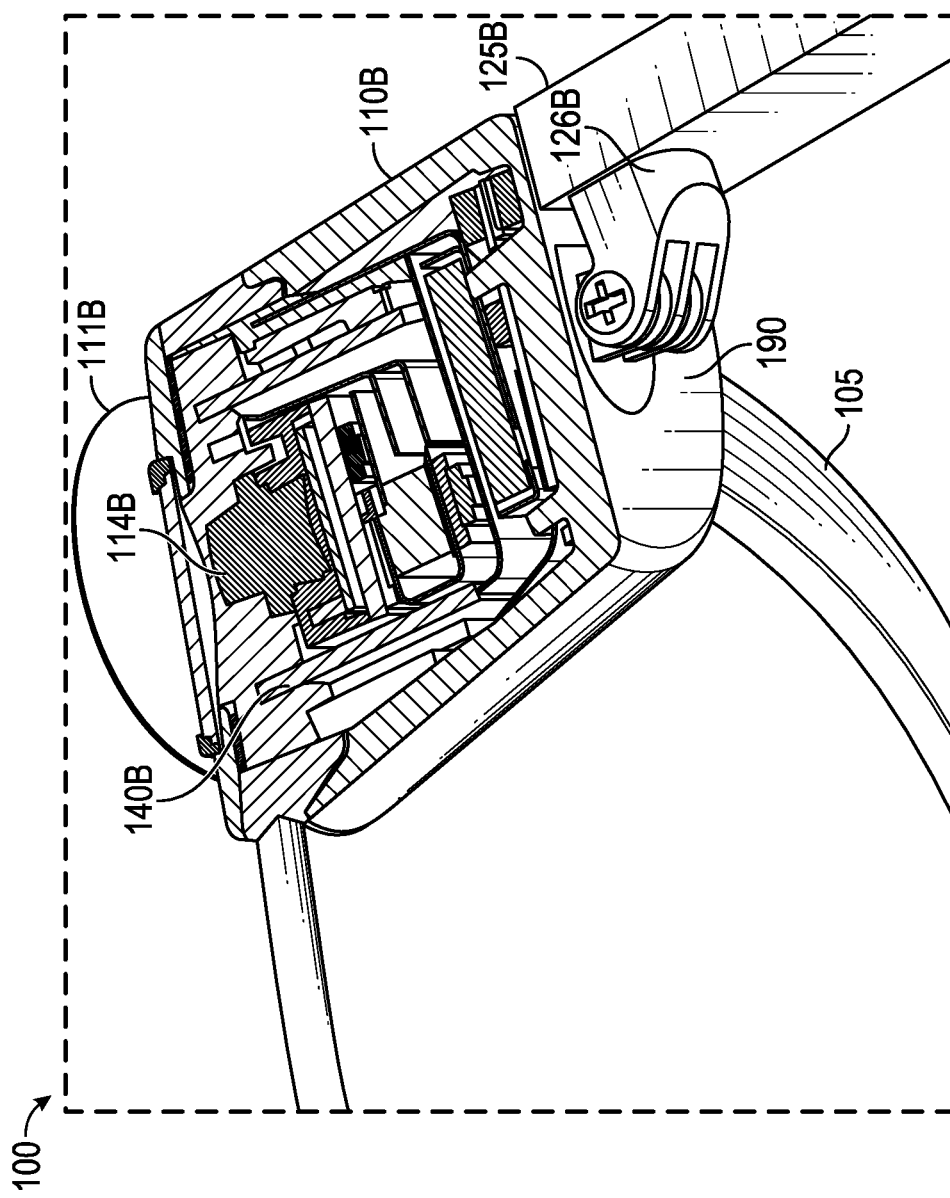
FIG. 1B is a perspective, partly sectional view of a right corner of the eyewear device of FIG. 1A depicting a right visible-light camera, and a circuit board.
Figure 1C:
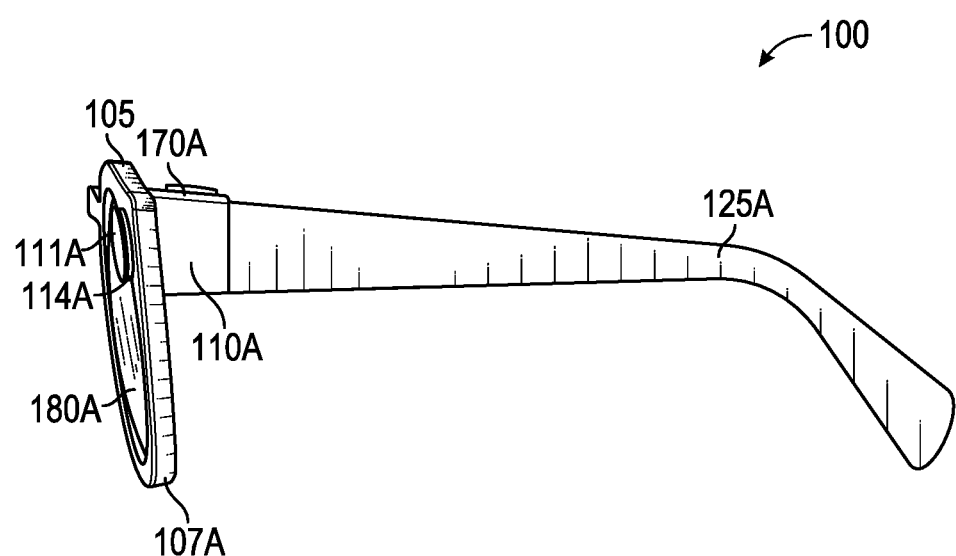
FIG. 1C is a side view (left) of an example hardware configuration of the eyewear device of FIG. 1A, which shows a left visible-light camera.
Figure 1D:
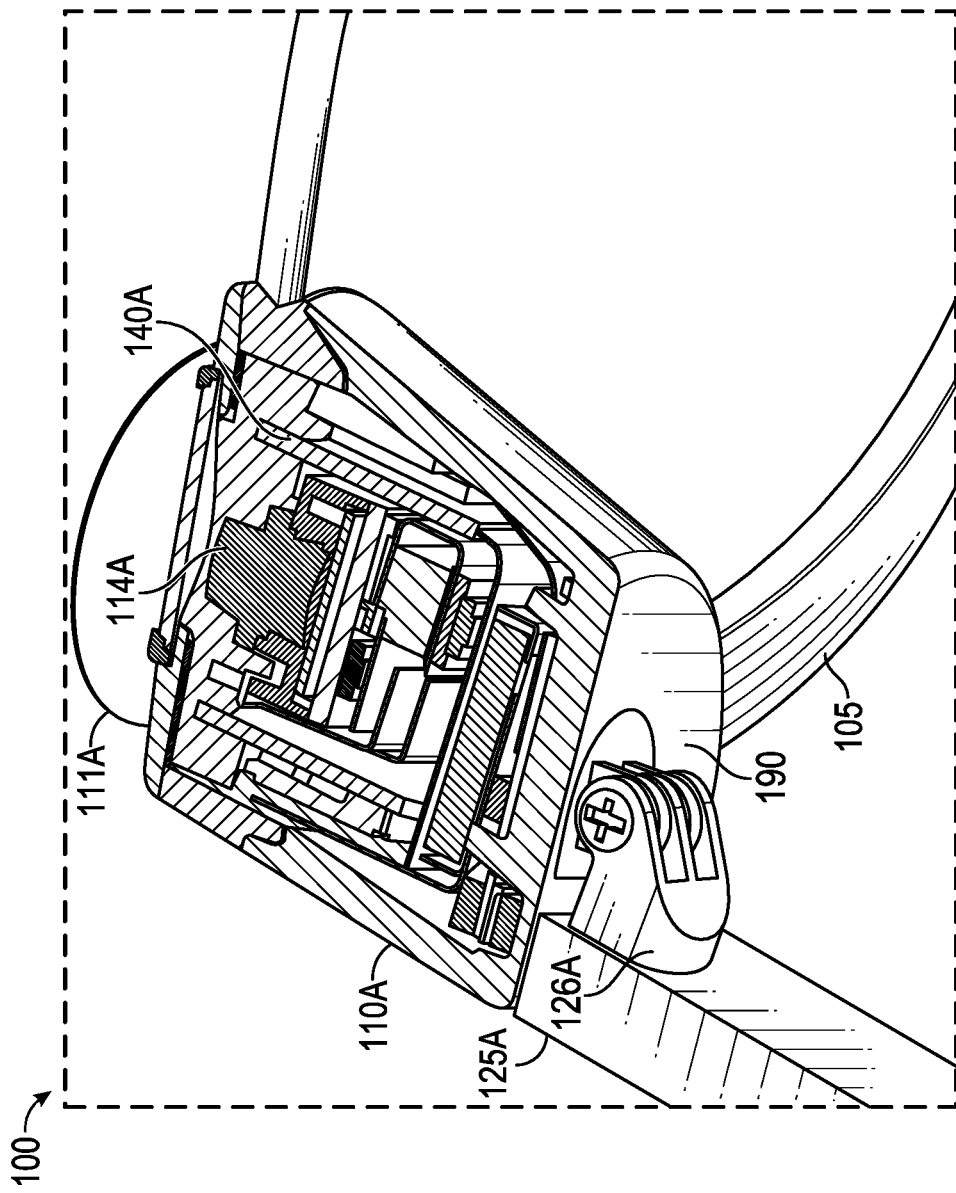
FIG. 1D is a perspective, partly sectional view of a left corner of the eyewear device of FIG. 1C depicting the left visible-light camera, and a circuit board.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. A left hinge 126B connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via Wi-Fi).

Figure 2A:
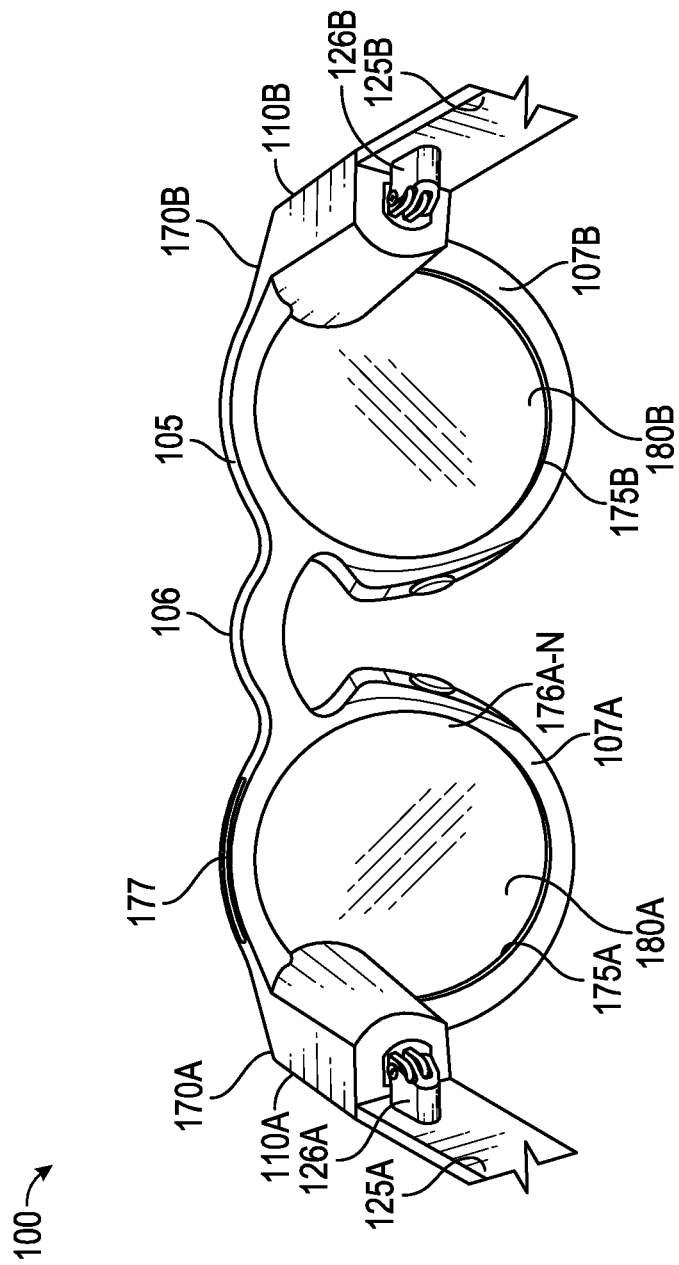
FIGS. 2A and 2B are rear views of example hardware configurations of an eyewear device utilized in an example element animation system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
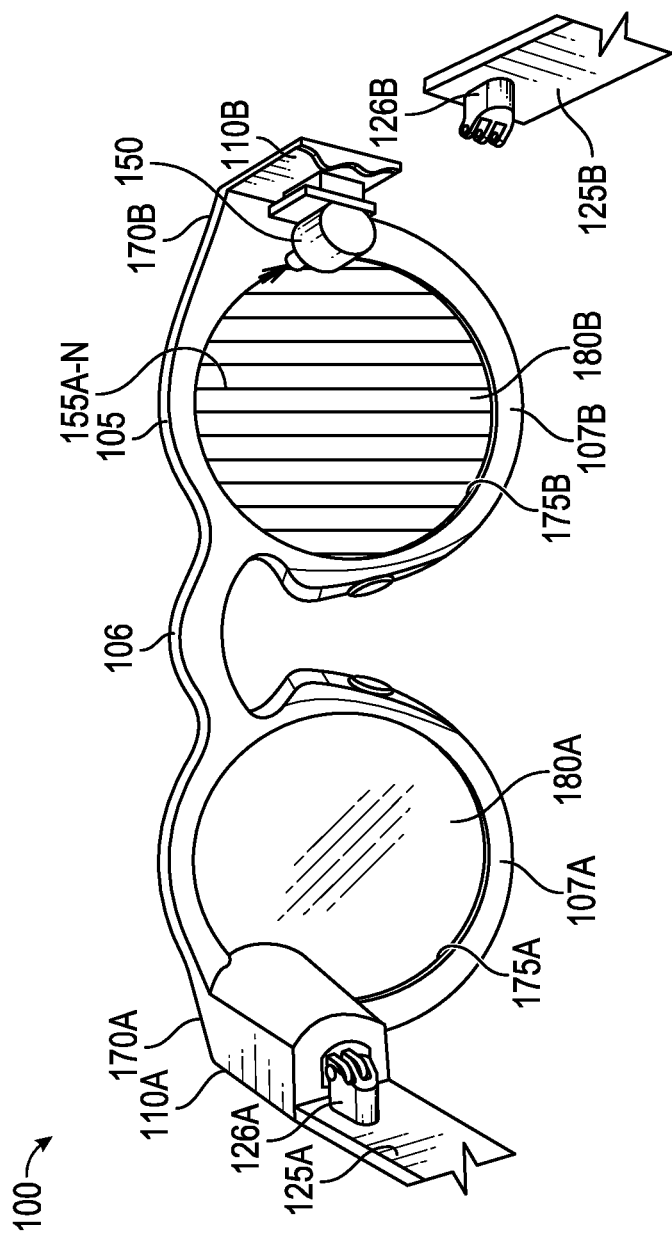

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge or diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector (not shown) and a right projector (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150. Similarly, the right optical assembly 180B may include a right display matrix 177B (not shown) or a right set of optical strips 155"A, 155"B, . . . 155"N (155 double prime, A through N, not shown) which are configured to interact with light from the right projector. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the element animation system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
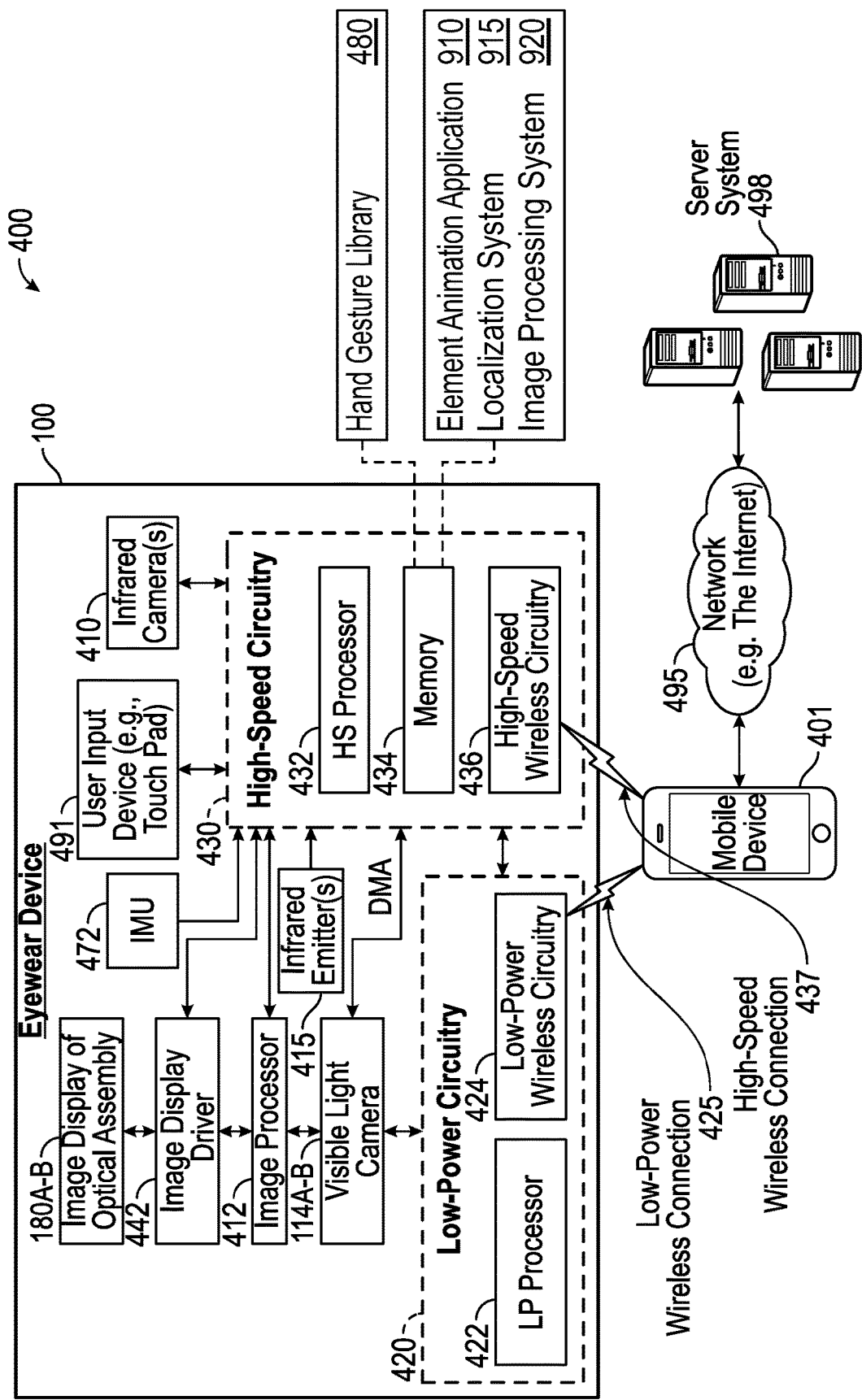
FIG. 4 is a functional block diagram of an example element animation system including a wearable device (e.g., an eyewear device) and a server system connected via various networks.

FIG. 4 is a functional block diagram of an example element animation system 400 that includes a wearable device (e.g., an eyewear device 100), a mobile device 401, and a server system 498 connected via various networks 495 such as the Internet. As shown, the element animation system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor 213 in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more speakers (e.g., one associated with the left side of the eyewear device and another associated with the right side of the eyewear device). The speakers may be incorporated into the frame 105, temples 125, or corners 110 of the eyewear device 100. The one or more speakers are driven by audio processor under control of low-power circuitry 420, high-speed circuitry 430, or both. The speakers are for presenting audio signals including, for example, a beat track. The audio processor is coupled to the speakers in order to control the presentation of sound.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
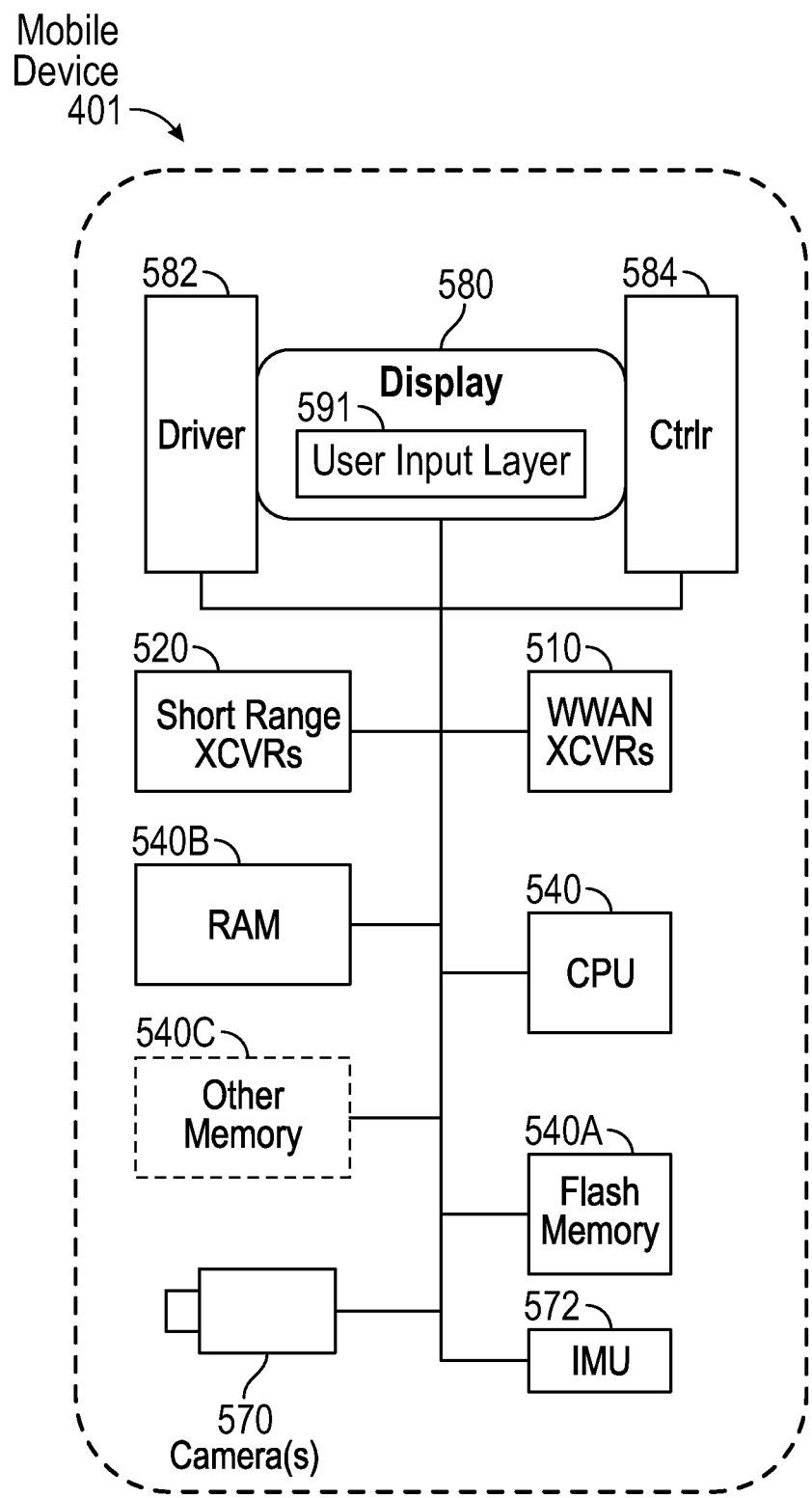
FIG. 5 is a diagrammatic representation of an example hardware configuration for a mobile device suitable for use in the example element animation system of FIG. 4.

As shown in FIG. 4, the high-speed processor 432 of the eyewear device 100 can be coupled to the camera system (visible-light cameras 114A, 114B), the image display driver 442, the user input device 491, and the memory 434. As shown in FIG. 5, the CPU 540 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The element animation system 400, as shown in FIG. 4, includes a computing device, such as mobile device 401, coupled to an eyewear device 100 over a network. The element animation system 400 includes a memory for storing instructions and a processor for executing the instructions. Execution of the instructions of the element animation system 400 by the processor 432 configures the eyewear device 100 to cooperate with the mobile device 401. The element animation system 400 may utilize the memory 434 of the eyewear device 100 or the memory elements 540A, 540B, 540C of the mobile device 401 (FIG. 5). Also, the element animation system 400 may utilize the processor elements 432, 422 of the eyewear device 100 or the central processing unit (CPU) 540 of the mobile device 401 (FIG. 5). In addition, the element animation system 400 may further utilize the memory and processor elements of the server system 498. In this aspect, the memory and processing functions of the element animation system 400 can be shared or distributed across the processors and memories of the eyewear device 100, the mobile device 401, and the server system 498.

The memory 434, in some example implementations, includes or is coupled to a hand gesture library 480, as described herein. The process of detecting a hand shape, in some implementations, involves comparing the pixel-level data in one or more captured frames of video data 900 to the hand gestures stored in the library 480 until a good match is found.

The memory 434 additionally includes, in some example implementations, an element animation application 910, a localization system 915, and an image processing system 920. In an element animation system 400 in which a camera is capturing frames of video data 900, the element animation application 910 configures the processor 432 to control the movement of a series of virtual items 700 on a display in response to detecting one or more hand shapes or gestures. The localization system 915 configures the processor 432 to obtain localization data for use in determining the position of the eyewear device 100 relative to the physical environment. The localization data may be derived from a series of images, an IMU unit 472, a GPS unit, or a combination thereof. The image processing system 920 configures the processor 432 to present a captured still image on a display of an optical assembly 180A, 180B in cooperation with the image display driver 442 and the image processor 412.

FIG. 5 is a high-level functional block diagram of an example mobile device 401. Mobile device 401 includes a flash memory 540A which stores programming to be executed by the CPU 540 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool) and an image display 580 for displaying content.

As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The client device 401 in some examples includes a collection of motion-sensing components referred to as an inertial measurement unit (IMU) 572 for sensing the position, orientation, and motion of the client device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the client device 401 (including the acceleration due to gravity) relative to three orthogonal axes (x, y, z). The gyroscope senses the angular velocity of the client device 401 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the client device 401 relative to magnetic north.

The IMU 572 may include or cooperate with a digital motion processor or programming that gathers the raw data from the components and compute a number of useful values about the position, orientation, and motion of the client device 401. For example, the acceleration data gathered from the accelerometer can be integrated to obtain the velocity relative to each axis (x, y, z); and integrated again to obtain the position of the client device 401 (in linear coordinates, x, y, and z). The angular velocity data from the gyroscope can be integrated to obtain the position of the client device 401 (in spherical coordinates). The programming for computing these useful values may be stored in on or more memory elements 540A, 540B, 540C and executed by the CPU 540 of the client device 401.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 540 in FIG. 5. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 540, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 540 or processor hardware in smartphone, laptop computer, and tablet.

The CPU 540 serves as a programmable host controller for the mobile device 401 by configuring the mobile device 401 to perform various operations, for example, in accordance with instructions or programming executable by CPU 540. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 540, e.g., as a working data processing memory. The flash memory 540A typically provides longer-term storage.

Hence, in the example of mobile device 401, the flash memory 540A is used to store programming or instructions for execution by the CPU 540. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. Sensor data includes images received from one or both of the cameras 114A, 114B, distance(s) received from a laser range finder, position information received from a GPS unit, motion and acceleration data received from an IMU 572, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Sensor data includes image(s) received from one or both cameras 114A, 114B, distance(s) received from a laser range finder, position information received from a GPS unit, motion and acceleration data received from an IMU 472, or a combination of data from such sensors, or from other sensors that provide data useful in determining positional information.

Figure 6:
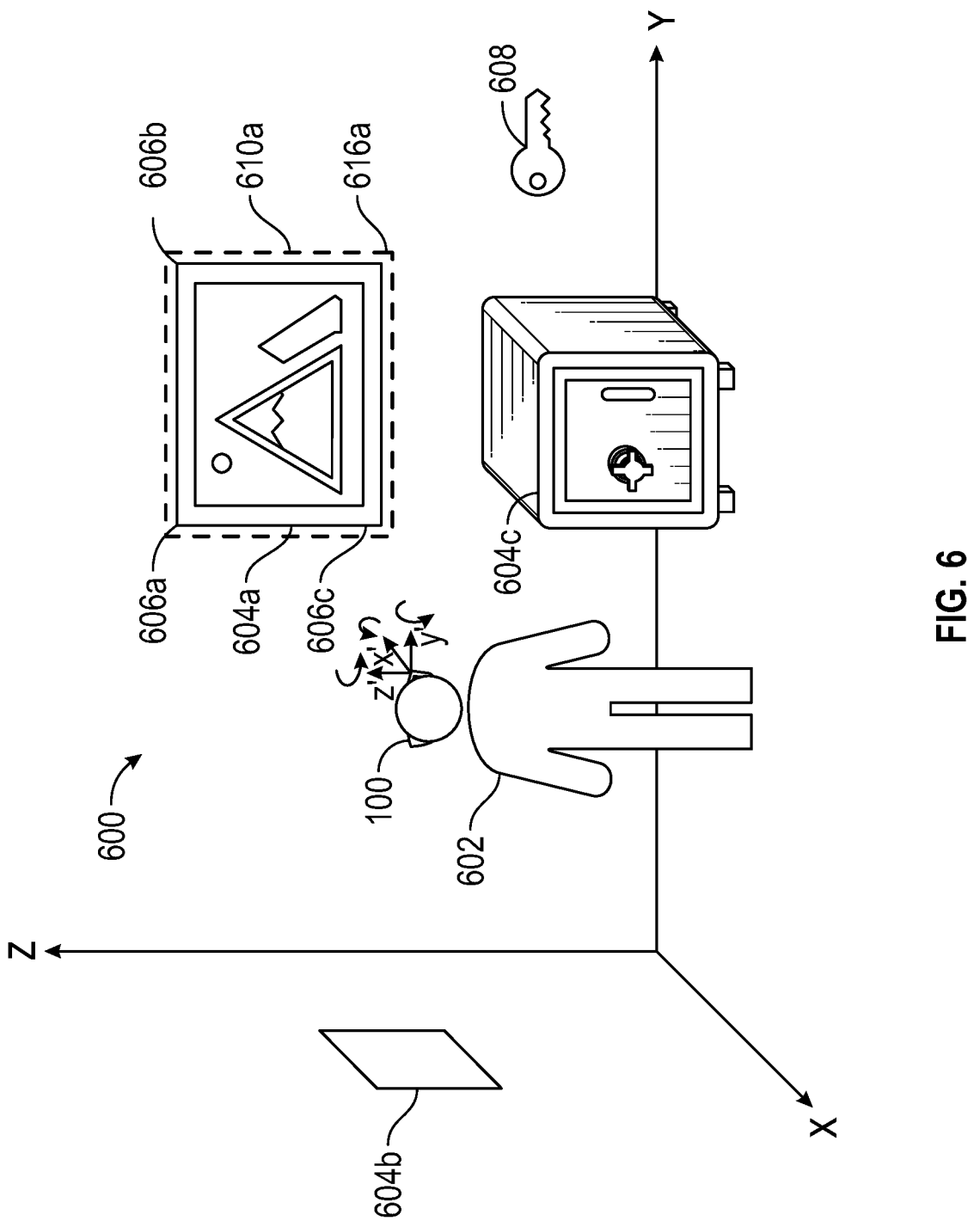
FIG. 6 is a schematic illustration of a user in an example environment for use in describing simultaneous localization and mapping.

FIG. 6 depicts an example physical environment 600 along with elements that are useful when using a SLAM application and other types of tracking applications (e.g., natural feature tracking (NFT)). A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position a virtual object 608 (such as the key shown in FIG. 6) within the environment 600 for viewing during an augmented reality experience.

The localization system 915 in some examples a virtual marker 610a associated with a virtual object 608 in the environment 600. In augmented reality, markers are registered at locations in the environment to assist devices with the task of tracking and updating the location of users, devices, and objects (virtual and physical) in a mapped environment. Markers are sometimes registered to a high-contrast physical object, such as the relatively dark object, such as the framed picture 604a, mounted on a lighter-colored wall, to assist cameras and other sensors with the task of detecting the marker. The markers may be preassigned or may be assigned by the eyewear device 100 upon entering the environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6. The marker location may be expressed relative to real-world geographic coordinates, a system of marker coordinates, a position of the eyewear device 100, or other coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The key 608 shown in FIG. 6, for example, is a virtual object displayed as a still image, either 2D or 3D, at a marker location.

In one example, the marker 610a may be registered in memory as being located near and associated with a physical object 604a (e.g., the framed work of art shown in FIG. 6). In another example, the marker may be registered in memory as being a particular position with respect to the eyewear device 100.

Figure 10:
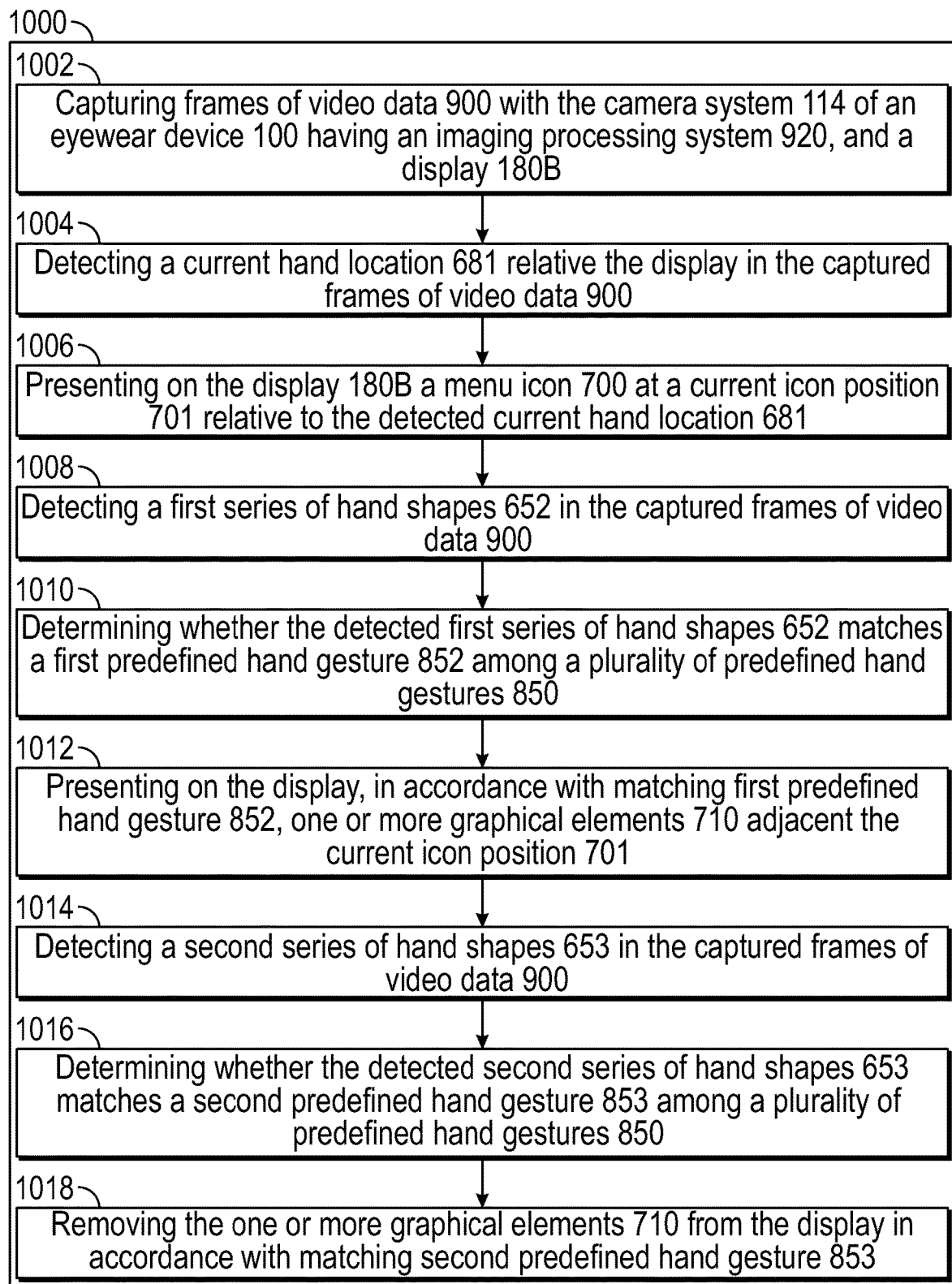
FIG. 10 is a flow chart listing the steps in an example method of controlling the presentation on a display of virtual elements or graphical elements in response to detected hand shapes that are associated with one of a plurality of predefined hand gestures.

FIG. 10 is a flow chart 1000 depicting an example method of controlling the presentation of a virtual element or graphical element on the display 180B of an eyewear device 100. Although the steps are described with reference to the eyewear device 100 described herein, other implementations of the steps described, for other types of devices, will be understood by one of skill in the art from the description herein. One or more of the steps shown and described may be performed simultaneously, in a series, in an order other than shown and described, or in conjunction with additional steps. Some steps may be omitted or, in some applications, repeated.

Figure 7:
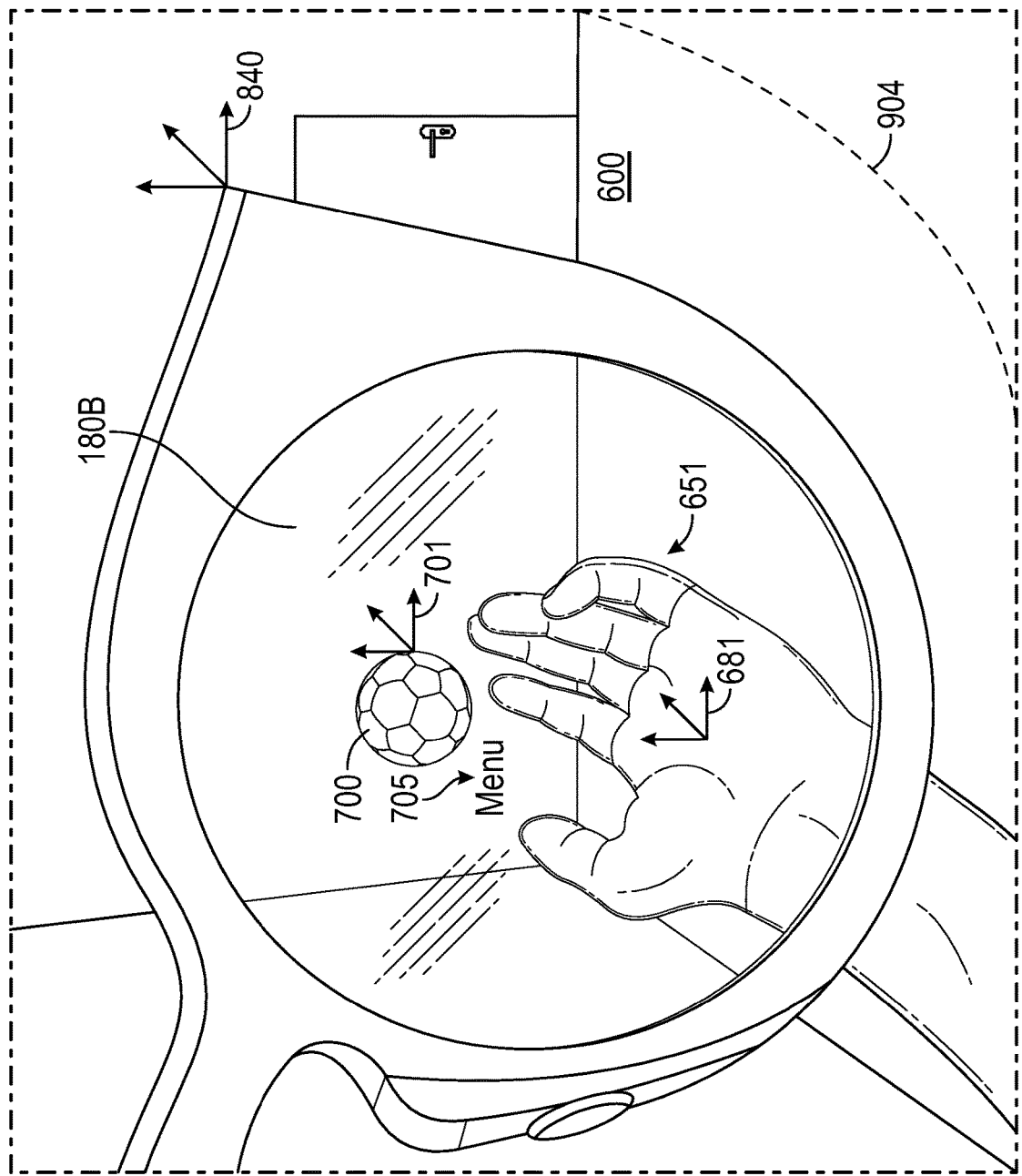
FIG. 7 is a perspective illustration of an example preliminary of hand shape associated with a cradling gesture, for interacting with an example menu icon on a display.

Block 1002 in FIG. 10 describes an example step of capturing frames a video data 900 with the camera system 114 of an eyewear device 100. In some implementations, the camera system 114 includes one or more cameras 114A, 114B, as described herein, for capturing either still images or frames of video data 900. The eyewear device 100 in this example includes an image processing system 920, a localization system 915, and one or more displays 180A, 180B. For example, as shown in FIG. 7, the eyewear device 100 includes a semi-transparent image display 180B which, as described herein, may include a semi-transparent lens layer and a display matrix layer configured to present images on the lens of the eyewear device. Graphical and virtual elements 700, 705, 710 (see FIG. 8) are presented as an overlay relative the physical environment 600. The effect, as shown, allows the viewer to see and interact with the presented elements 700 while the surrounding environment 600 also remains visible through the display 180B.

In some implementations, the high-speed processor 432 of the eyewear device 100 stores the captured frames of video data 900 with a camera system 114 as the wearer moves through a physical environment 600. As described herein and shown in FIG. 7, the camera system 114 typically has a camera field of view 904 that captures images and video beyond the limits of the display 180B.

The camera system 114, in some implementations, includes one or more high-resolution, digital cameras equipped with a CMOS image sensor capable of capturing high-definition still images and high-definition video at relatively high frame rates (e.g., thirty frames per second or more). Each frame of digital video includes depth information for a plurality of pixels in the image. In this aspect, the camera system 114 serves as a high-definition scanner by capturing a detailed input image of the physical environment. The camera system 114, in some implementations, includes a pair of high-resolution digital cameras 114A, 114B coupled to the eyewear device 100 and spaced apart to acquire a left-camera raw image and a right-camera raw image, as described herein. When combined, the raw images form an input image that includes a matrix of three-dimensional pixel locations. The example method, at block 1002, in some implementations, includes storing the captured frames of video data 900 in memory 434 on the eyewear device 100, at least temporarily, such that the frames are available for analysis.

Block 1004 describes an example step of detecting a hand 651 in the captured frames of video data 900 with the image processing system 920. In some example implementations, the image processing system 920 analyzes the pixel-level data in the captured frames of video data 900 to determine whether the frame includes a human hand and, if so, whether the framed includes the upturned palm or palmar surface of the hand, as illustrated in FIG. 7. The process of detecting a hand 651 includes detecting a current hand location 681 in three-dimensional coordinates relative to the display 180B or to another known position, such as the eyewear location 840, as shown.

FIG. 7 is a perspective illustration of an example hand 651 at a current hand location 681. The process of detecting at block 1004, in some implementations, is accomplished by the image processing system 920. The hand 651 may be predefined to be the left hand, as shown. In some implementations, the system includes a process for selecting and setting the hand, right of left, which will serve as the hand 651 to be detected.

Those skilled in the art will understand that the process of detecting and tracking includes detecting the hand, over time, in various postures, in a set or series of captured frames of video data 900. In this context, the detecting process at block 1004 refers to and includes detecting a hand in as few as one frame of video data, as well as detecting the hand, over time, in a subset or series of frames of video data. Accordingly, in some implementations, the process at block 1004 includes detecting a hand 651 in a particular posture in one or more of the captured frames of video data 900. In other implementations, the process at block 1004 includes detecting the hand, over time, in various postures, in a subset or series of captured frames of video data 900, which are described herein as a series of preliminary hand shapes 651. In this aspect, the still images of hands 651, 652, 653 shown in the figures refer to and include such illustrated hands either as a still image or as part of a series of hand shapes.

Block 1006 in FIG. 10 describes an example step of presenting a menu icon 700 on the display 180B. The menu icon 700 is presented at a current icon position 701, as shown in FIG. 7. The current icon position 701 is defined in relation to, and in accordance with the detected current hand location 681, such that the menu icon 700 moves on the display as the hand location 681 moves in the physical environment 600, over time, as detected and tracked in the captured frames of video data 900.

Although the example steps are described with reference to a menu icon 700, the process may be applied and used with other icons and graphical elements unrelated to a menu. In some implementations the menu icon 700 is a virtual element that is sized and shaped to be apparently graspable by a hand, such as the round ball-like three-dimensional polyhedron shown in FIG. 8. In this aspect, presenting a virtual menu icon 700 that is apparently graspable invites the user, intuitively, to perform a grasping or cradling gesture. The menu icon 700 may include a ball, polygon, circle, polyhedron, or other shape; regular or irregular; rendered as a two-dimensional shape or as a three-dimensional object. The menu icon 700 may be presented along with a menu label 705, as shown.

In some implementations, a menu icon 700 has been presented on the display 180B prior to the process of detecting a hand. For example, another system or application that is currently running on the eyewear device 100 may include a series of actions which logically proceed to the presentation of a menu icon 700 on the display. The menu icon 700 may be presented at a default position, such as the center of the display 180B. At such a point, the running application may access the processes described herein, starting in some implementations with detecting a hand 651 at block 1004 and then at block 1006 presenting the menu icon 700 at a current icon position 701 relative to the detected current hand location 681.

In other implementations, the menu icon 700 is not presented on the display 180B unless and until the hand 651 is detected, in any position or posture, in at least one frame of video data at block 1004. In this example, detecting a hand 651 results in presenting the menu icon 700 on the display 180B. In other example implementations, the menu icon 700 is not presented on the display 180B unless and until, at block 1004, the hand 651 is detected in a particular posture or hand shape.

In some implementations, the menu icon 700 is not presented on the display 180B unless and until, at block 1004, a preliminary series of hand shapes 651 is detected. In this example, preliminary series of hand shapes 651 includes a sequence of hand shapes in the captured framed of video data 900, such as the hand shapes that include an upturned palmar surface with relaxed fingers, as shown in FIG. 7.

After the detecting step, the process then includes determining whether the detected preliminary series of hand shapes matches a preliminary predefined hand gesture 851 (e.g., a cradling gesture) from among a plurality of predefined hand gestures 850 stored in a hand gesture library 480, as described herein. If the detected preliminary series of hand shapes 651 matches the preliminary predefined hand gesture 851, then the process of presenting a menu icon 700 is executed.

Block 1008 describes an example step of detecting a first series of hand shapes 652 in the captured frames of video data 900 with the image processing system 920. The image processing system 920 analyzes the pixel-level data in the captured frames of video data 900 to track the motion of the hand.

Figure 8:
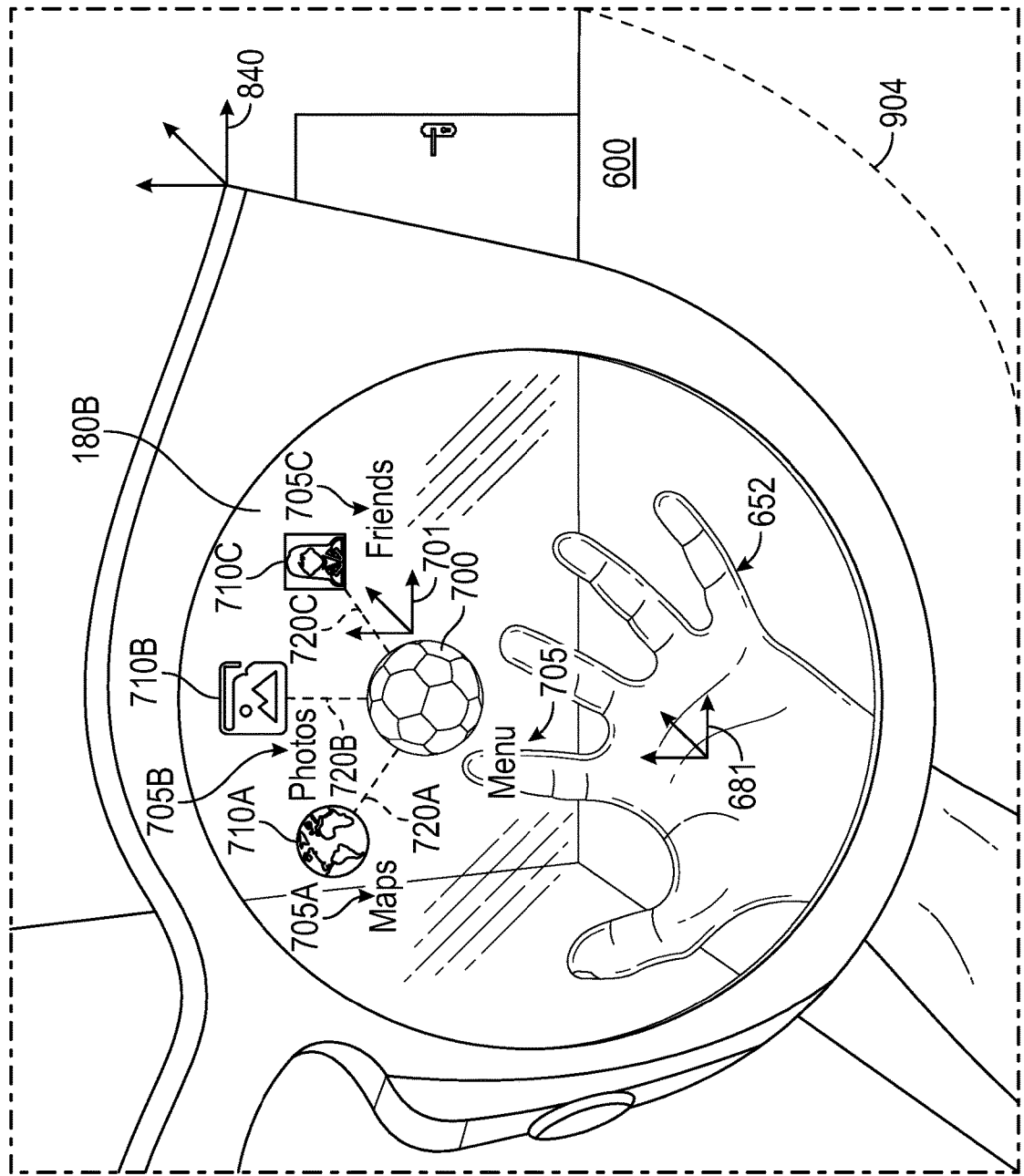
FIG. 8 is a perspective illustration of an example first hand shape associated with an opening gesture, for presenting one or more graphical elements on a display.

FIG. 8 is a perspective illustration of an example first series of hand shapes 652 in which the hand performs an opening gesture (e.g., the fingers are opening relative to the palm). The first series of hand shapes 652 in some implementations includes one or more fingers extending from a relaxed position (e.g., shown in FIG. 7) to a hyperextended position relative to the palm, as shown in FIG. 8. The process in some implementations includes detecting the series of current finger or fingertip locations in three-dimensional coordinates relative to the current hand location 681 or to another known position, such as the display 180B or the current eyewear location 840.

As used herein, the term hyperextended refers to and includes one or more fingers of the hand in an extended orientation relative to the palm. The extent of the hyperextension may be defined as one or more fingers located within a predefined threshold distance or angle relative to a plane defined by the palm of the hand.

The example process at block 1010 includes determining whether the detected first series of hand shapes 652 matches any one of a plurality of predefined hand gestures 850 stored in the hand gesture library 480. The data stored in the captured frames of video data 900 is compared to the predefined hand gestures 650 stored in the library of hand gestures 480. Any of a variety of other predefined hand gestures 850 may be established and stored in the hand gesture library 480.

In the example shown in FIG. 8, the image processing system 920 analyzes the pixel-level data in the captured frames of video data 900 to determine whether the hand 652 is performing an opening gesture. The predefined opening gesture, in this example, includes a sequence of hand poses in which one or more fingers is hyperextended relative to the palmar surface.

The hand gesture library 480 includes a large number of poses and gestures, including descriptions of a hand in various positions and orientations. The stored poses and gestures are suitable for ready comparison to a hand shape that is detected in an image. A hand gesture record stored in the library 480 in some implementations includes three-dimensional coordinates for a number of landmarks on the hand, including the wrist, the fifteen interphalangeal joints, and the five fingertips, as well as other skeletal and soft-tissue landmarks. A hand gesture record stored in the library 480 may also include text identifiers, point of view annotations, directional references (e.g., palmar, dorsal, lateral), rotational references (e.g., stable, flexing, extending, pronating, supinating), and other data and descriptors related to each predefined hand gesture 850. Each hand gesture record stored in the library 480 may include a set of exemplary three-dimensional coordinates for each joint and the tip, a hand position identifier (e.g., neutral hand), and a finger position identifier (e.g., index, flexed, partial). For a hand gesture (e.g., a series of hand poses observed over time), a hand gesture record stored in the library 480 may include a set of exemplary three-dimensional coordinates for each joint and the tip at each location of the index finger, over a particular time interval (e.g., two seconds or longer), a hand motion identifier (e.g., pronating, supinating, stable), and a finger motion identifier (e.g., index flexing and extending continually).

For the opening gesture, the record stored in the hand gesture library 480, in some implementations, includes a gesture identifier (e.g., opening), a first motion identifier (e.g., fingers hyperextended to within a predefined threshold distance or angle relative to the palm), a minimum duration (e.g., one second), and a subsequent motion identifier (e.g., relaxing, returning toward the palm)—along with a series of exemplary three-dimensional coordinates for each hand and finger landmark during the time interval (e.g., twenty coordinate sets, every five milliseconds).

The process at block 1010, in some implementations, includes comparing the detected first series of hand shapes 652 captured in the video data 900, over a period of time, on a pixel-by-pixel level, to the plurality of predefined opening hand shapes that are stored in the hand gesture library 480 until a match is identified. As used herein, the term match is meant to include substantial matches or near matches, which may be governed by a predetermined confidence value associated with possible or candidate matches. The detected hand shape data may include three-dimensional coordinates for the wrist, up to fifteen interphalangeal joints, up to five fingertips, and other skeletal or soft-tissue landmarks found in a captured frame. In some examples, the detecting process includes calculating the sum of the geodesic distances between the detected hand shape fingertip coordinates and a set of fingertip coordinates for each hand gesture stored in the library 480. A sum that falls within a configurable threshold accuracy value represents a match.

Referring again to FIG. 10, the example process at block 1012 includes presenting on the display 180B one or more graphical elements 710 adjacent the current icon position 701 in accordance with the matching first predefined hand gesture 852.

As used herein, the one or more graphical elements 710 means and includes any collection of graphical elements presented on a display, including but not limited to virtual objects associated with VR experiences and graphical elements such as icons, thumbnails, taskbars, and menu items. For example, the graphical elements 710A, 710B, 710C in FIG. 8 represent selectable menu items including maps, photos, and friends, and may include element labels 705A, 705B, 705C, as shown.

The one or more graphical elements 710 are presented on the display 180B at positions that are adjacent to the current menu icon position 701. For example, the graphical elements 710 in some implementations are located a predefined default distance away from the current icon position 701. When the current icon position 701 changes, the locations of the graphical elements 710 also change, so that the graphical elements 710 and the menu icon 700 are persistently displayed together as a grouping and appear to move together. Moreover, because the current menu icon position 701 is correlated with the current hand location 681 (at block 1004), the graphical elements 710 and the menu icon 700 move as the hand moves. In this aspect, the graphical elements 710 are apparently anchored to the hand location 681 (as opposed to remaining anchored to the display 180B).

In one aspect, the physical process of opening the fingers of the hand is in accordance, intuitively, with the virtual process of opening the menu icon 700 on the display. The opening motion of the fingers corresponds to the opening of the menu icon 710.

In accordance with the opening gesture, the process of presenting the graphical elements 710 in some implementations includes animating a progression of each element along a path extending away from the menu icon 700. For example, FIG. 8 illustrates a first graphical element 710A and a first path 720A that extends away from the menu icon 700. The animated progression, in some implementations, includes presenting the first graphical element 710A at a series of incremental locations along the first path 720A, thereby simulating a progressive emerging of the first graphical element 710A from the menu icon 700. FIG. 8 also shows a second graphical element 710B and a second path 720B; and a third graphical element 710C and a third path 720C.

In some implementations, the apparent speed of the animated progression is correlated with the detected first series of hand shapes 652. In this aspect, the faster the fingers open, the faster the animated progression occurs.

The paths 720A, 720B, 720C in some implementations extend in a generally radial direction relative to a ball-shaped menu icon 700, as shown in FIG. 8. The paths 720A, 720B, 720C are similar in length and the graphical elements 710A, 710B, 710C move incrementally along their respective paths together, nearly in unison.

In other example implementations, one or more of the graphical elements 710 is correlated with the detected motion of a particular finger on the hand. In this example, the graphical elements 710 move incrementally along their respective paths 720 separately, according to the detected current position of a particular finger of the hand. For example, the first graphical element 710A shown in FIG. 8 is presented at a series of incremental locations along the first path 720A in accordance with the detected current position of the thumb. Because the thumb is located on the left side of the hand 652, it would be naturally associated with the leftmost first graphical element 710A. The faster the thumb opens, the faster the animated progression of the first graphical element 710A takes place along the first path 720A. Moreover, if the thumb pauses or retreats, the first graphical element 710A would pause or retreat, in accordance with the detected current thumb location.

Block 1014 describes an example step of detecting a second series of hand shapes 653 in the captured frames of video data 900 with the image processing system 920. The image processing system 920 analyzes the pixel-level data in the captured frames of video data 900 to track the motion of the hand.

Figure 9:
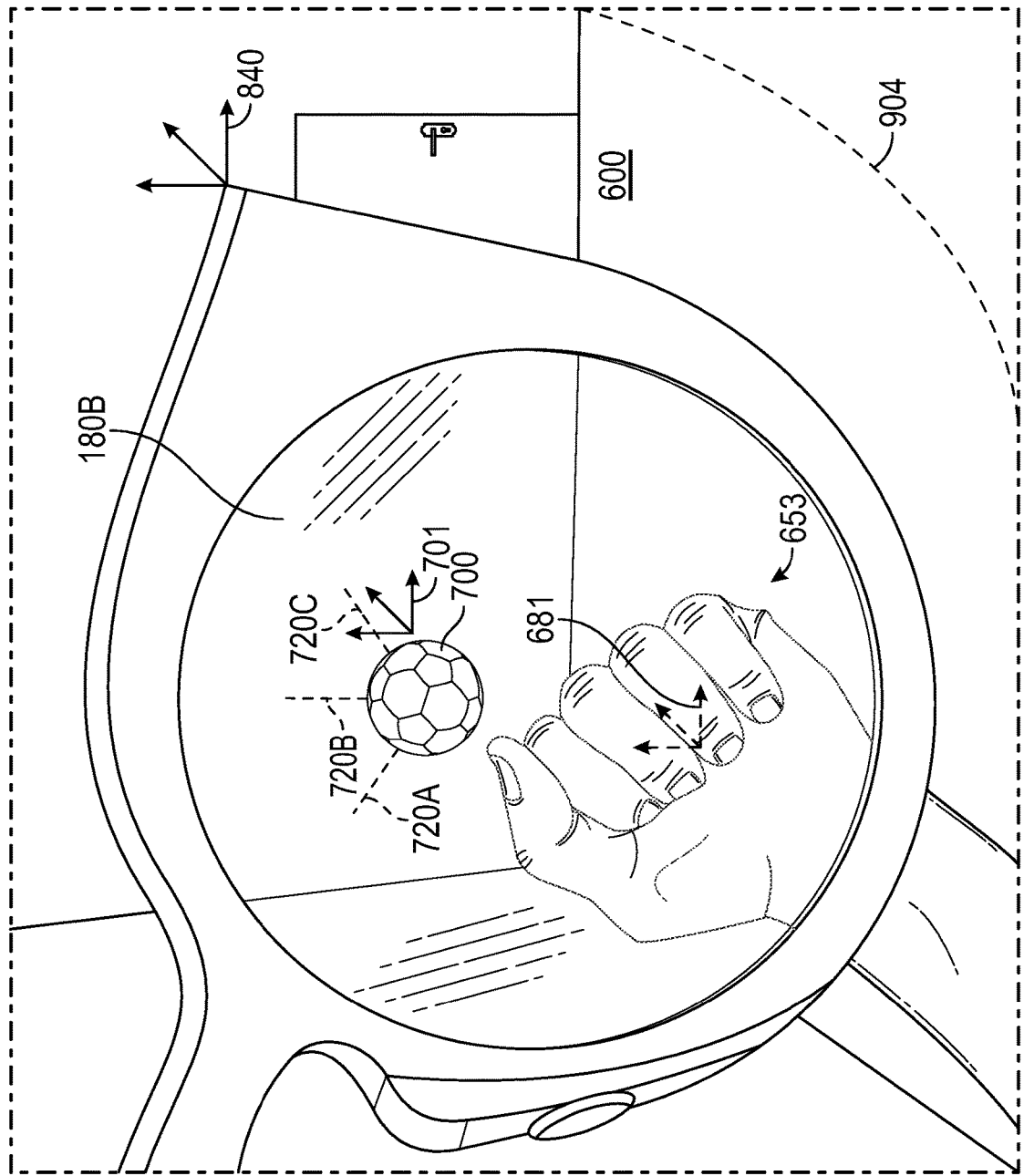
FIG. 9 is a perspective illustration of an example second hand shape associated with a closing gesture, for removing one or more graphical elements from a display.

FIG. 9 is a perspective illustration of an example second series of hand shapes 653 in which the hand performs a closing gesture (e.g., making a fist). The second series of hand shapes 653 in some implementations includes one or more fingers moving toward the palm to make a fist, as shown in FIG. 9. The process in some implementations includes detecting the series of current finger or fingertip locations in three-dimensional coordinates relative to the current hand location 681 or to another known position, such as the display 180B or the current eyewear location 840.

The example process at block 1016 includes determining whether the detected second series of hand shapes 653 matches any one of a plurality of predefined hand gestures 850 stored in the hand gesture library 480. The image processing system 920 analyzes the pixel-level data in the captured frames of video data 900 over a period of time and compares the data about the detected second series of hand shapes 653 to the predefined hand gestures 650 stored in the library 480 until a match is identified.

For the closing gesture, the record stored in the hand gesture library 480, in some implementations, includes a gesture identifier (e.g., closing), a motion identifier (e.g., fingers closing toward the palm to make a fist), a minimum duration (e.g., one second), and a subsequent motion identifier (e.g., relaxing)—along with a series of exemplary three-dimensional coordinates for each hand and finger landmark during the time interval (e.g., twenty coordinate sets, every five milliseconds).

The example process at block 1018 includes removing the one or more graphical elements 710 from the display 180B in accordance with the matching first predefined hand gesture 853. The graphical elements 710 disappear from the display 180B when the detected hand closes into a fist. In this aspect, the physical process of closing the fingers of the hand is in accordance, intuitively, with the virtual process of closing the menu represented by the menu icon 700 on the display.

In accordance with the closing gesture, the process of removing the graphical elements 710 in some implementations includes animating a regression of each element along a path extending toward the menu icon 700. For example, FIG. 9 illustrates a first path 720A along which the first graphical element 710A appeared to move as it regressed or withdrew toward and into menu icon 700. The animated progression, in some implementations, includes presenting the first graphical element 710A at a series of incremental locations along the first path 720A, thereby simulating a progressive retreating or collapsing of the first graphical element 710A back into the menu icon 700. the second and third paths 720B, 720C are also shown in FIG. 9.

In some implementations, the apparent speed of the animated regression is correlated with the detected first series of hand shapes 653. In this aspect, the faster the fingers close, the faster the animated regression occurs. The paths 720A, 720B, 720C in some implementations are similar in length and the graphical elements 710A, 710B, 710C move incrementally along their respective paths together, nearly in unison, toward the menu icon 700. In other example implementations, one or more of the graphical elements 710 is correlated with the detected motion of a particular finger on the hand; and move in accordance with the detected current position of a particular finger of the hand, as described herein.

The menu icon 700 in some implementations remains presented on the display 180B, as shown in FIG. 9. The process steps and methods described herein may be repeated. For example, a subsequent series of hand shapes may match an opening gesture, resulting in another presentation of the graphical elements 710 as described.

The process steps and methods described herein may be terminated when a hand is detected in a palm down position (e.g., revealing the distal surface of the hand), when the hand is partly or completely removed from the camera's field of view 904, or when a predefined stopping gesture is detected.

In some implementations, the presenting process steps (at blocks 1006 and 1012) are executed such that the menu icon 700 and the graphical elements 710 are presented on the display 180B in accordance with the current eyewear location 840 relative to the current hand location 681. In this example implementation, the sizes and shapes, and orientations of the menu icon 700 and the graphical elements 710 varies depending on the relative motion between the eyewear device 100 (at the current eyewear location 840) and the hand (at the current hand location 681). A localization system 915 on the eyewear device 100 in some implementations configures the processor 432 on the eyewear 100 to obtain localization data for use in determining the current eyewear location 840 relative to the detected hand location 681. The localization data may be derived from the captured frames of video data 900, an IMU unit 472, a GPS unit, or a combination thereof. The localization system 915 may construct a virtual map of various elements within the camera field of view 904 using a SLAM algorithm, as described herein, updating the map and the location of objects at least as frequently as the frame rate of the camera system 114 (e.g., calculating and updating the mapping and localization of the current eyewear location 840 as frequently as thirty times per second, or more).

The process of localization includes an example step of calculating a correlation between the detected current hand location 681 and the current eyewear location 840. The term correlation refers to and includes one or more vectors, matrices, formulas, or other mathematical expressions sufficient to define the three-dimensional distance between the detected current hand location 681 and the eyewear display 180B, in accordance with the current eyewear location 840. The current eyewear location 840 is tied to or persistently associated with the display 180B which is supported by the frame of the eyewear device 100. In this aspect, the correlation performs the function of calibrating the motion of the eyewear 100 with the motion of the hand 650. Because the localization process at block 1010 occurs continually and frequently, the correlation is calculated continually and frequently, resulting in accurate and near real-time tracking of the current hand location 681 relative to the current eyewear location 840.

In another example implementation, the processes at block 1010 and block 1016 of determining whether a detected series of hand shapes matches any of the predefined hand gestures 850 involves using a machine-learning algorithm to compare the pixel-level data about the hand shape in one or more captured frames of video data to a collection of images that include hand gestures.

Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence and autonomous navigation, to extract and analyze data in digital images and video.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video. The connectivity pattern between nodes in a CNN is typically modeled after the organization of the human visual cortex, which includes individual neurons arranged to respond to overlapping regions in a visual field. A neural network that is suitable for use in the determining process described herein is based on one of the following architectures: VGG16, VGG19, ResNet50, Inception V3, Xception, or other CNN-compatible architectures.

In the machine-learning example, at block 1010 and block 1016, the processor 432 determines whether a detected series of bimanual hand shapes substantially matches a predefined hand gesture using a machine-trained algorithm referred to as a hand feature model. The processor 432 is configured to access the hand feature model, trained through machine learning, and applies the hand feature model to identify and locate features of the hand shape in one or more frames of the video data.

In one example implementation, the trained hand feature model receives a frame of video data which contains a detected hand shape and abstracts the image in the frame into layers for analysis. Data in each layer is compared to hand gesture data stored in the hand gesture library 480, layer by layer, based on the trained hand feature model, until a good match is identified.

In one example, the layer-by-layer image analysis is executed using a convolutional neural network. In a first convolution layer, the CNN identifies learned features (e.g., hand landmarks, sets of joint coordinates, and the like). In a second convolution layer, the image is transformed into a plurality of images, in which the learned features are each accentuated in a respective sub-image. In a pooling layer, the sizes and resolution of the images and sub-images are reduced in order isolation portions of each image that include a possible feature of interest (e.g., a possible palm shape, a possible finger joint). The values and comparisons of images from the non-output layers are used to classify the image in the frame. Classification, as used herein, refers to the process of using a trained model to classify an image according to the detected hand shape. For example, an image may be classified as a "touching action" if the detected series of bimanual hand shapes matches the touching gesture stored in the library 480.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™ ANDROID™, WINDOWS® Phone, or another mobile operating system. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of controlling virtual elements in response to hand gestures detected with an eyewear device, the eyewear device comprising a camera system, an image processing system, and a display, the method comprising:
   capturing frames of video data with the camera system;
   detecting a hand at a current hand location relative to the display in the captured frames of video data using the image processing system, wherein detecting the hand comprises detecting a palm location and at least a first finger location relative to the palm location;
   presenting on the display a virtual menu icon at a current icon position, in accordance with the detected current hand location, wherein the virtual menu icon is associated with at least a first virtual graphical menu element;
   associating the first virtual graphical menu element with the first finger location; and
   presenting on the display the first virtual graphical menu element along a first path relative to the current icon position based on the first finger location, such that the first virtual graphical menu element appears persistently correlated with the first finger location relative to the palm location, wherein presenting the first virtual graphical menu element comprises:
   animating a progression of the first virtual graphical menu element along the first path extending away from the current icon position, such that the first virtual graphical menu element appears to emerge from the virtual menu icon, and
   animating the progression of the first virtual graphical menu element along the first path at an apparent progression speed based on the first finger location relative to the palm location.

2. The method of claim 1, wherein the virtual menu icon is associated with one or more other virtual graphical menu elements, and wherein detecting the hand comprises detecting the palm location and one or more other finger locations relative to the palm location, the method further comprising:
   associating each of the one or more other virtual graphical menu elements with each of the one or more other finger locations; and
   presenting on the display one or more other virtual graphical menu elements relative to the current icon position based on its associated finger location.

3. The method of claim 1, wherein the eyewear device further comprises a localization system, and wherein the method further comprises:
   determining, with the localization system, a current eyewear location relative to the current hand location;
   calculating a correlation between the current hand location and the display, in accordance with the current eyewear location;
   presenting on the display the virtual menu icon in accordance with the calculated correlation, such that the virtual menu icon appears persistently correlated with the current eyewear location.

4. The method of claim 1, wherein presenting the virtual menu icon comprises:
   sizing the virtual menu icon in accordance with the detected hand, such that the virtual menu icon appears graspable on the display relative to the hand, wherein the virtual menu icon comprises a shape selected from a group consisting of a polygon, a ball, a polyhedron, and an apparently graspable object.

5. The method of claim 1, wherein detecting the hand further comprises:
   detecting a preliminary series of hand shapes;
   determining whether the detected preliminary series of hand shapes matches a preliminary predefined hand gesture from among a plurality of predefined hand gestures stored in a hand gesture library; and
   presenting on the display the virtual menu icon in accordance with the matching preliminary predefined hand gesture.

6. The method of claim 5, wherein the detected preliminary series of hand shapes comprises an exposed palmar surface with relaxed fingers, and
   wherein the preliminary predefined hand gesture comprises a preliminary sequence of poses characterized by one or more fingers relaxed relative to the exposed palmar surface.

7. The method of claim 1, wherein detecting the hand further comprises:
   detecting a series of hand shapes;
   determining whether the detected series of hand shapes matches a predefined hand gesture from among a plurality of predefined hand gestures stored in a hand gesture library; and
   presenting on the display the first virtual graphical menu element in accordance with the matching predefined hand gesture.

8. The method of claim 7, wherein the detected series of hand shapes comprises one or more fingers extending from a relaxed position to a hyperextended position relative to a palmar surface, and
wherein the predefined hand gesture comprises a first sequence of poses characterized by one or more fingers hyperextended relative to a palm,
such that the first virtual graphical menu element appears to open relative to the virtual menu icon in response to the detected series of hand shapes.

9. The method of claim 7, wherein the detected series of hand shapes comprises one or more fingers closing into a fist, and
wherein the predefined hand gesture comprises a second sequence of poses characterized by one or more fingers closed toward a palm in a fist, and
such that the first virtual graphical menu element appears to close relative to the virtual menu icon in response to the detected series of hand shapes.

10. A system for controlling virtual elements, comprising:
an eyewear device comprising a processor, a memory, a camera system, an image processing system, and a display; and
programming in the memory, wherein execution of the programming by the processor configures the eyewear device to perform functions, including functions to:
capture frames of video data with the camera system;
detect a hand at a current hand location relative to the display in the captured frames of video data using the image processing system, wherein the detect function comprises a function to detect a palm location and at least a first finger location relative to the palm location;
present on the display a virtual menu icon at a current icon position, in accordance with the detected current hand location, wherein the virtual menu icon is associated with at least a first virtual graphical menu element;
associate the first virtual graphical menu element with the first finger location; and
present on the display the first virtual graphical menu element along a first path relative to the current icon position based on the first finger location, such that the first virtual graphical menu element appears persistently correlated with the first finger location relative to the palm location, wherein the function to present the first virtual graphical menu element comprises functions to:
animate a progression of the first virtual graphical menu element along the first path extending away from the current icon position, such that the first virtual graphical menu element appears to emerge from the virtual menu icon, and
animate the progression of the first virtual graphical menu element along the first path at an apparent progression speed based on the first finger location relative to the palm location.

11. The system of claim 10, wherein the virtual menu icon is associated with one or more other virtual graphical menu elements,
wherein the detect function comprises a function to detect the palm location and one or more other finger locations relative to the palm location, and
wherein execution of the programming further configures the eyewear device to perform functions to:
associate each of the one or more other virtual graphical menu elements with each of the one or more other finger locations; and
present on the display one or more other virtual graphical menu elements relative to the current icon position based on its associated finger location.

12. The system of claim 10, wherein the eyewear device further comprises a localization system, wherein execution of the programming further configures the eyewear device to perform functions to:
determine with the localization system a current eyewear location relative to the current hand location;
calculate a correlation between the current hand location and the display, in accordance with the current eyewear location;
present on the display the virtual menu icon in accordance with the calculated correlation, such that the virtual menu icon appears persistently correlated with the current eyewear location.

13. The system of claim 10, wherein the function to present the virtual menu icon further comprises functions to:
size the virtual menu icon in accordance with the detected hand, such that the virtual menu icon appears graspable on the display relative to the hand, wherein the virtual menu icon comprises a shape selected from a group consisting of a polygon, a ball, a polyhedron, and an apparently graspable object.

14. The system of claim 10, wherein the detect function further comprises functions to:
detect a series of hand shapes;
determine whether the detected series of hand shapes matches a predefined hand gesture from among a plurality of predefined hand gestures stored in a hand gesture library; and
present on the display the first virtual graphical menu element in accordance with the matching predefined hand gesture.

15. The system of claim 14, wherein the detected series of hand shapes comprises one or more fingers extending from a relaxed position to a hyperextended position relative to a palmar surface, and
wherein the predefined hand gesture comprises a first sequence of poses characterized by one or more fingers hyperextended relative to a palm,
such that the first virtual graphical menu element appears to open relative to the virtual menu icon in response to the detected series of hand shapes.

16. The system of claim 14, wherein the detected series of hand shapes comprises one or more fingers closing into a fist, and
wherein the predefined hand gesture comprises a second sequence of poses characterized by one or more fingers closed toward a palm in a fist, and
such that the first virtual graphical menu element appears to close relative to the virtual menu icon in response to the detected series of hand shapes.

17. A non-transitory computer-readable medium storing program code which, when executed, is operative to cause an electronic processor to perform the steps of:
capturing frames of video data using a camera system coupled with an eyewear device, the eyewear device further comprising an image processing system, a localization system, and a display;
detecting a hand at a current hand location relative to the display in the captured frames of video data using the image processing system, wherein detecting the hand comprises detecting a palm location and at least a first finger location relative to the palm location;
presenting on the display a virtual menu icon at a current icon position, in accordance with the detected current hand location, wherein the virtual menu icon is associated with at least a first virtual graphical menu element;

associating the first virtual graphical menu element with the first finger location; and presenting on the display the first virtual graphical menu element along a first path relative to the current icon position based on the first finger location, such that the first virtual graphical menu element appears persistently correlated with the first finger location relative to the palm location, wherein presenting the first virtual graphical menu element comprises:

animating a progression of the first virtual graphical menu element along the first path extending away from the current icon position, such that the first virtual graphical menu element appears to emerge from the virtual menu icon, and animating the progression of the first virtual graphical menu element along the first path at an apparent progression speed based on the first finger location relative to the palm location.

18. The non-transitory computer-readable medium storing program code of claim 17, wherein the program code which, when executed, is operative to cause an electronic processor to perform the further steps of:

sizing the virtual menu icon in accordance with the detected hand, such that the virtual menu icon appears graspable on the display relative to the hand, wherein the virtual menu icon comprises a shape selected from a group consisting of a polygon, a ball, a polyhedron, and an apparently graspable object;

determining, with the localization system, a current eyewear location relative to the current hand location;

calculating a correlation between the current hand location and the display, in accordance with the current eyewear location; and presenting on the display the virtual menu icon in accordance with the calculated correlation, such that the virtual menu icon appears persistently correlated with the current eyewear location.

* * * * *